Sept. 30, 1969   W. D. LUDWIG   3,469,600
SOLENOID OPERATED VALVE
Filed Jan. 15, 1968   2 Sheets-Sheet 1
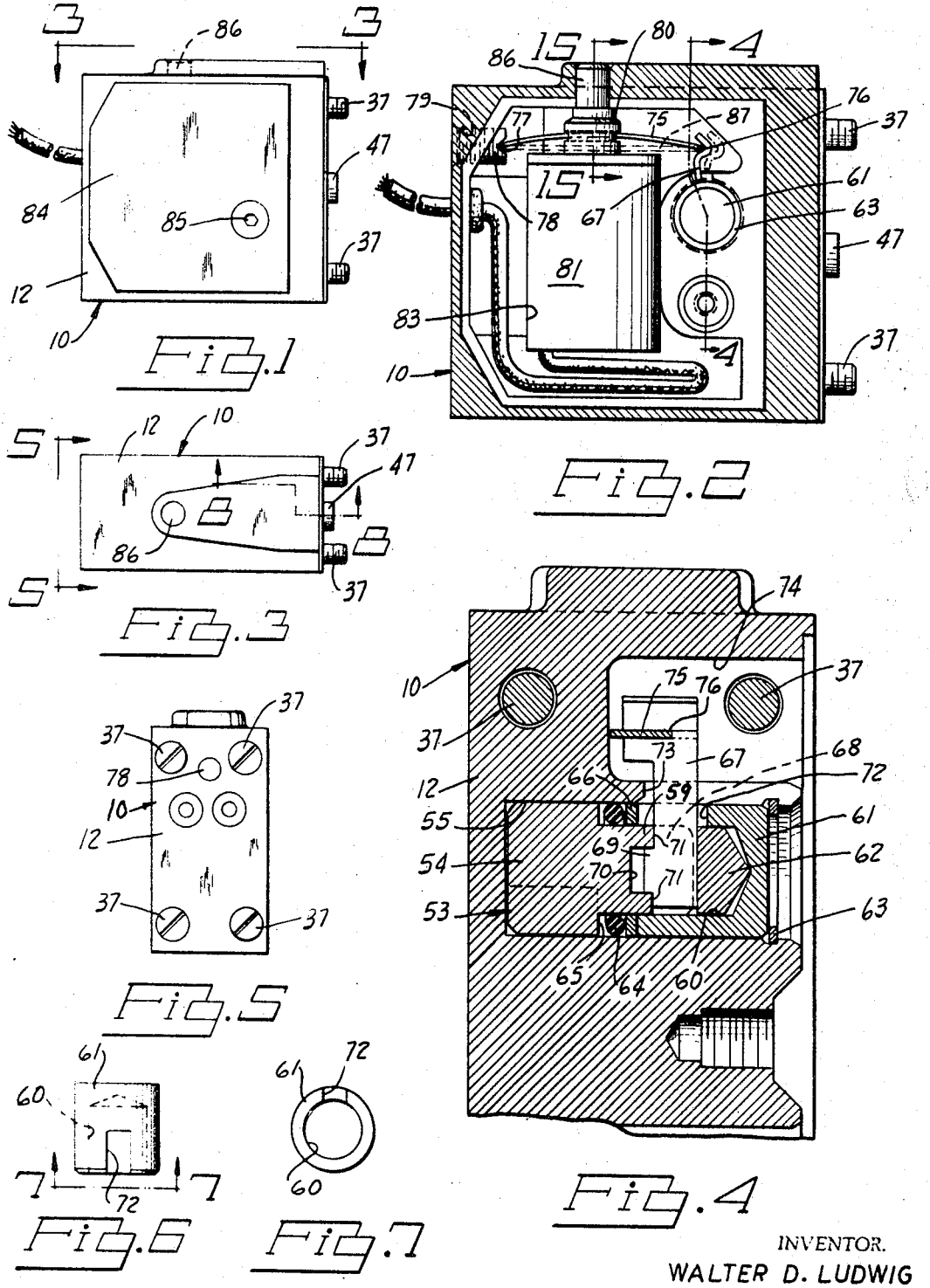
INVENTOR.
WALTER D. LUDWIG
BY
Donnelly, Mentag & Harrington
ATTORNEYS

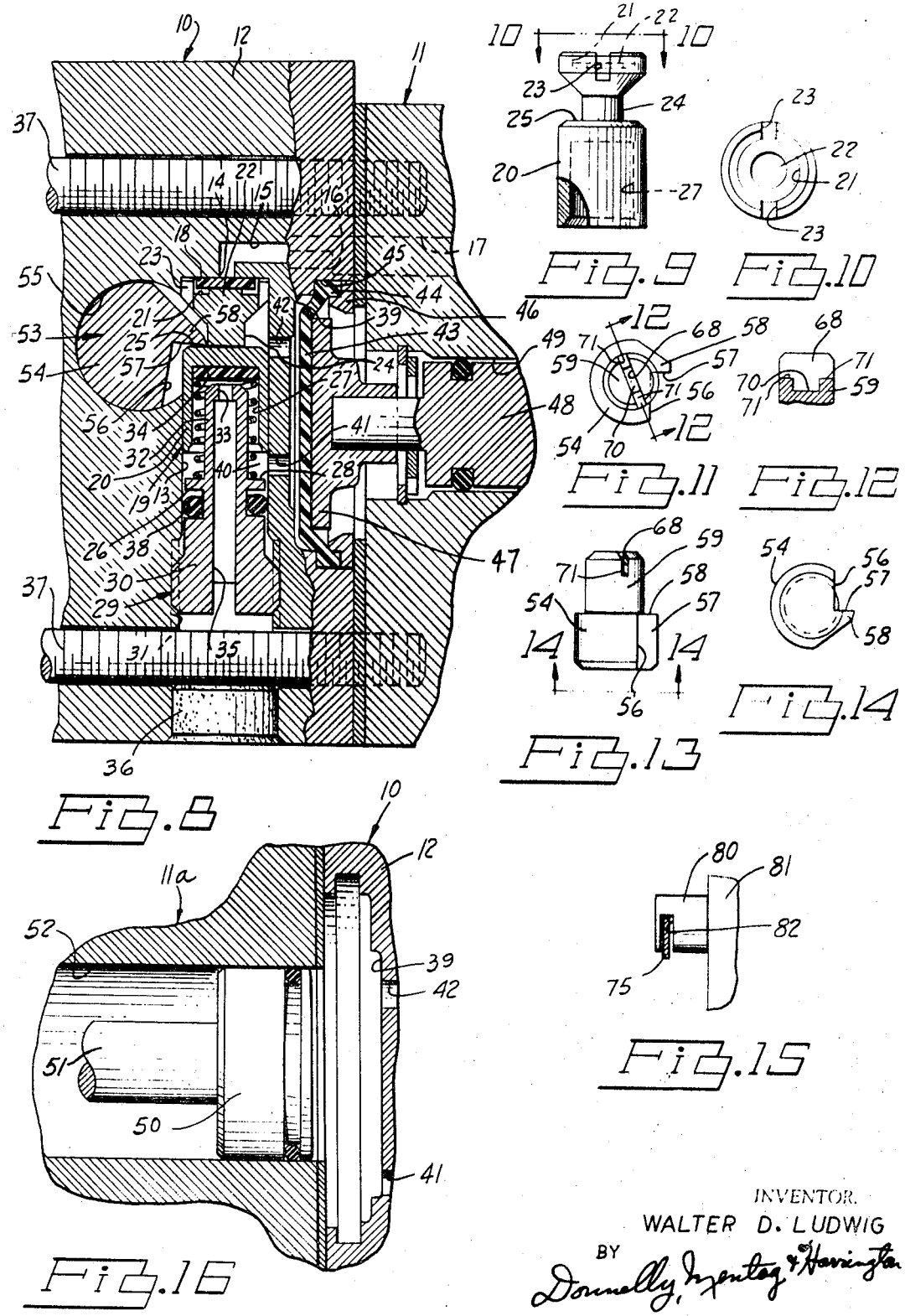

United States Patent Office 3,469,600
Patented Sept. 30, 1969

3,469,600
SOLENOID OPERATED VALVE
Walter D. Ludwig, Bloomfield Township, Oakland County, Mich., assignor to Mac Valves, Inc., Oak Park, Mich., a corporation of Michigan
Filed Jan. 15, 1968, Ser. No. 697,882
Int. Cl. F16k 11/24, 31/04
U.S. Cl. 137—596.17                                    22 Claims

ABSTRACT OF THE DISCLOSURE

A three-way double poppet valve having a valve chamber with an inlet orifice at one end of the valve chamber connected to a source of fluid under pressure, fluid passage means communicating with the valve chamber for conveying fluid under pressure into operative engagement with a fluid pressure operated member of an apparatus to be operated by the valve, an adjustable member in the valve chamber providing an outlet orifice disposed in spaced alignment with the inlet orifice, a movable cylindrical valve member interposed between the inlet orifice and the outlet orifice, said valve member having a deep pocket facing the outlet orifice and a shallow pocket facing the inlet orifice and having a centrally located external groove. two identical flat circular valve elements of resilient material, the one loosely inserted in the shallow pocket of the valve member and adjacent to the inlet orifice and the other loosely inserted in the deep pocket of the valve member and adjacent to the outlet orifice, a spring means located in the deep pocket of the valve element for normally biasing the movable cylindrical valve member to a first position closing the inlet orifice and opening the outlet orifice, a rotary actuator engaging the centrally located external grove of the movable cylindrical valve member for moving the same against the action of the biasing spring to a second position opening the inlet orifice and closing the outlet orifice, and means for rotating the rotary actuator comprising a toggle spring means and an electrical solenoid means.

SUMMARY OF THE INVENTION

This invention relates generally to solenoid operated valves, and more particularly, to a solenoid operated, three-way, double poppet valve adapted for use in pilot valve operations, or for use in similar fluid-flow control operations.

Heretofor, the available solenoid operated valves have utilized disproportionately large solenoids to provide the necessary force to operate the valves, and this is a disadvantage resulting in excessive space requirements as well as high manufacturing cost. Another disadvantage of the prior art solenoid operated valves is the need for holding close manufacturing tolerances of related component parts to avoid an unreasonable accumulation of such tolerances to achieve satisfactory performance of both the solenoid and valve. Another disadvantage of the prior art solenoid operated valves lies in the commonly employed direct method of transmitting the power of the solenoid, which solenoid of necessity must be isolated from the fluid stream, to actuate the valve element which of necessity must perform its function within the fluid stream. Still another disadvantage of the prior art solenoid operated valves lies in the difficulty of matching the seated position of the valve poppet with the closed position of the solenoid, both of which positions must occur simultaneously to avoid malfunction of either the valve poppet or the solenoid.

In view of the foregoing, it is an important object of the present invention to provide a novel and improved solenoid operated valve which overcomes the aforementioned disadvantages of the prior art solenoid operated valves.

It is another object of the present invention to provide a solenoid operated, three-way, double poppet valve which is adapted to be operated by a very small electrical solenoid and means for mechanically amplifying its force to permit the solenoid to operate a valve quickly and yet provide an efficient, magnetic seal.

It is another object of the present invention to provide a novel and improved solenoid operated, three-way, double poppet valve that incorporates a pair of opposed poppet type valve seals which are adapted to open and close alternately an inlet orifice and an outlet orifice, and which are moved between their operative positions by a rotary actuator that is operated by utilizing the principle of a toggle joint and an electrical solenoid. One of the poppet type valve seals is freely movable and unconfined at its outer periphery, and so adapted to automatically close the inlet orifice when the supply of pressurized fluid drops or is terminated and the solenoid is still energized, so as to avoid malfunction during a holding action on the apparatus being controlled by the valve.

It is still another object of the present invention to provide a solenoid operated, three-way, double poppet valve which incorporates a shuttle valve member, a rotary actuator member engaged with the shuttle valve member, a curved leaf toggle spring having one end in contact with the rotary actuator member and the other end in contact with an adjustable stop, and an electrical solenoid having a plunger attached to the midpoint of the curved leaf toggle spring, so that when the solenoid is energized the solenoid plunger will collapse the leaf spring to a straightened position causing the leaf spring to act as a toggle utilizing its end thrust to rotate the rotary actuator member, and when the solenoid is de-energized the leaf spring will return the solenoid plunger to the de-energized position.

It is a further object of the present invention to provide a novel improved solenoid operated, three-way, double poppet valve which includes a valve body, a valve chamber in said valve body, an inlet orifice formed in said valve body and communicating with said valve chamber and a source of fluid under pressure for admitting fluid under pressure into said valve chamber, fluid passage means communicating with said valve chamber for receiving fluid under pressure from said valve chamber and conveying it into operative engagement with a movable fluid pressure operated member of an apparatus operated by the valve, an outlet orifice for exhausting fluid to the exterior of the valve from said valve chamber and fluid passage means, a first valve element freely movable in said valve chamber for movement between a closed position over said inlet orifice to block flow of fluid therethrough and an open position to allow flow of fluid into the valve chamber, a valve element operating means movably mounted in said valve chamber, a second valve element movable between a closed position over said outlet orifice to block flow of fluid therethrough and an open position to exhaust said valve chamber and passage means, means normally biasing said valve element operating means in one direction to a first position to engage said first valve element and move it to its closed position over said inlet orifice and to move said second valve element to its open position, and, means engaging said valve element operating means and operative for moving the valve element operating means against the action of said biasing means in another direction to a second position, to allow said first valve element to be moved by fluid under pressure to its open position and to move said second valve element into its closed position, whereby when the source of fluid under presure is disconnected from said inlet orifice, the fluid under pressure in said valve chamber will move the freely movable first valve element to its closed position to hold the fluid under pressure in the valve chamber and fluid passage means until said last mentioned means is inoperative and allows the valve element operating means to be biased by said biasing means to its normal first position.

It is still a further object of the present invention to provide a novel and improved solenoid operated, three-way, double poppet valve, which is simple and compact in construction, economical to manufacture, and efficient in operation.

It is still another object of the present invention to provide a novel and improved solenoid operated, three-way, double poppet valve which includes, a pair of opposed poppet valves which are alternately movable to open and closed positions by a valve element operating means, a rotary actuator for moving the valve element operating means between two operating positions, a solenoid, and a toggle joint means interconnecting said rotary actuator and the valve element operating means, whereby when the solenoid is energized the toggle joint means rotates the rotary actuator to move the valve element operating means in one direction, and when the solenoid is de-energized the solenoid plunger is moved to its de-energized position.

Other objects, features and advantages of this invention will be apparent from the following detailed description, appended claims, and the accompanying drawings.

In the drawings:

FIG. 1 is a side elevational view of a valve made in accordance with the principles of the present invention and showing the actual size;

FIG. 2 is an enlarged, side elevational view, similar to FIG. 1, but with the side cover removed to show the solenoid and toggle spring means;

FIG. 3 is a top plan view of the valve structure illustrated in FIG. 1, taken along the line 3—3 thereof, and looking in the direction of the arrows;

FIG. 4 is a fragmentary, enlarged, elevational section view of the valve structure illustrated in FIG. 2 taken along the line 4—4 thereof, and looking in the direction of the arrows;

FIG. 5 is a left side elevational view of the valve structure illustrated in FIG. 3, taken along the line 5—5 thereof, and looking in the direction of the arrows;

FIG. 6 is a side elevational view of a bearing cap employed in the illustrated valve structure of FIG. 4;

FIG. 7 is a bottom plan view of the bearing cap structure shown in FIG. 6 taken along the line 7—7 thereof, and looking in the direction of the arrows;

FIG. 8 is a fragmentary, enlarged, elevational section view of the structure illustrated in FIG. 3 taken along the line 8—8 thereof, and looking in the direction of the arrows;

FIG. 9 is a side elevational view of the poppet valve plunger employed in the illustrated valve;

FIG. 10 is a top plan view of the structure illustrated in FIG. 9, taken along the line 10—10 thereof, and looking in the direction of the arrows;

FIG. 11 is a top view of a pivot shaft of the rotary actuator means employed in the illustrated valve;

FIG. 12 is a fragmentary, elevational section view of the structure illustrated in FIG. 11, taken along the line 12—12 thereof and looking in the direction of the arrows;

FIG. 13 is a side elevational view of the pivot shaft illustrated in FIG. 11;

FIG. 14 is a bottom plan view of the structure illustrated in FIG. 13, taken along the line 14—14 thereof, and looking in the direction of the arrows;

FIG. 15 is a fragmentary, elevational, section view with parts removed, of the structure illustrated in FIG. 2, taken along the line 15—15 thereof, and looking in the direction of the arrows; and, FIG. 16 is a fragmentary, elevational, section view of a portion of a valve made in accordance with the present invention and showing the valve adapted to operate a second type apparatus.

Referring now to the drawings, and more particularly to FIGS. 1 and 2, the numeral 10 generally designates a solenoid operated, three-way, double poppet valve made in accordance with the principles of the present invention. The valve 10 is illustrated in FIG. 8 as being used to operate an operating valve which is generally indicated by the numeral 11 and which is shown in fragment.

As shown in FIG. 8, the valve 10 includes a block-shaped valve housing or body 12, which is provided on one end thereof with a cylindrical recess 13 that forms a valve chamber. The valve chamber 13 is open at the outer end thereof and closed at the inner end thereof. Formed in the inner closed end of the valve chamber 13 is an inlet orifice 14 which communicates through passages 15 and 16 with the passage 17 in the operating valve 11. The passage 17 is adapted to be connected to the source of pressurized fluid which also supplies the operating fluid for the operating valve 11. It will be understood, however, that a separate source of pilot air could be provided, if desired.

As shown in FIG. 8, the inlet orifice 14 is normally closed by a first valve element 18 which is made from a resilient material in the form of a flat circular poppet seal. The valve element 18 is normally held in the closed position shown in FIG. 8 by a valve element operating means generally indicated by the numeral 19. The valve element operating means 19 includes a cylindrical plunger or valve member 20 which is provided on the inner end thereof with a shallow pocket 21 having a raised cylindrical central portion 22 that is adapted to seat on the central portion of the poppet seal 18 when the seal 18 is in the closed position shown in FIG. 8. The seal 18 is loosely inserted in the pocket 21 in a freely movable condition. The plunger 20 is shown in detail in FIGS. 9 and 10. The numerals 23 indicate a pair of transverse slots which communicate with the shallow pocket 21 and the centrally located external annular recess or groove 24 formed around the inner end of the plunger 20. The outer end of the groove 24 terminates at a shoulder 25 which is adapted to be engaged by an actuating means for moving the plunger 20 to unseat the poppet seal 18, as explained in detail hereinafter.

The valve element operating means 19 is normally biased to the position shown in FIG. 8 by a coil spring 26 which has one end thereof seated in a deep pocket 27 formed in the outer end of the cylindrical plunger 20. The outer end of the spring 26 is adapted to seat against a shoulder 28 which is formed on an adjustable exhaust stem member generally indicated by the numeral 29. The adjustable exhaust stem member 29 includes the cylindrical outer body 30 which is threaded on the outer periphery thereof and which is adapted to be threadably mounted in the outer threaded portion 31 of the valve chamber 13. The front or inner end of the adjustable exhaust stem member 29 is indicated by the numeral 32 and it is cylindrical and reduced in overall diameter, and it extends into the cylindrical deep pocket 27 formed in the rear end of the cylindrical plunger 20. The spring 26 surrounds the adjustable stem member reduced front end portion 32.

As shown in FIG. 8, an outlet orifice 33 is formed in a central position on the reduced inner end 32 of the adjustable stem member 29 and it is adapted to be closed by a second valve element 34 which is a second poppet seal. The second valve element 34 is positioned in the inner end of the cylindrical deep pocket 27 in the plunger or valve member 20. It will be seen that the plunger of valve member 20 functions both as a carrier for the valve element 34 and the spring 26. The outlet orifice 33 communicates with the atmosphere through the passageway 35 which is formed axially through the adjustable stem member 29. The exhausting fluid passes through the valve chamber outer threaded end portion 31 from the passageway 35 and thence to the atmosphere through a suitable filter plug 36.

As shown in FIG. 8, the valve 10 is attached to the operating valve 11 by mounting screws as 37, but these screws are not as large in diameter as the valve chamber outer threaded end 31, and accordingly, the fluid exhausting from the passageway 35 can pass around the screw 37. The adjustable stem member 29 is provided with a suitable O-ring seal means 38, around the periphery thereof.

It is apparent that the mounting screw 37, when in place, blocks access to the adjustable member 29 making it inaccessible and tamperproof when the valve is assembled.

As shown in FIG. 8, the valve 10 is provided with a pressurized fluid operating chamber 39 which is connected to the outlet orifice 33 by the valve chamber portion 40 and the passageway 41. The inner end of the valve chamber 13 is connected with the chamber 39 by the passageway 42. The fluid under pressure admitted to the valve chamber 13 is adapted to pass through the passageway 42 and into the chamber 39 to exert an operating pressure on the diaphragm 43 which encloses the outer end of the chamber 39. In the illustrative embodiment of FIG. 8, the diaphragm 43 is circular and is provided with a mounting lip 44 around the periphery thereof. The mounting lip 44 is seated in an annular recess 45 and is retained therein by a retaining ring 46. The diaphragm 43 is seated against the operating head 47 which is adapted to receive the end of a fluid pressure operated member or valve spool 48 which is in turn operatively mounted in a bore 49 formed in the end of the valve 11. It will be understood that the pressurized fluid admitted into the chamber 39 can be used in ways other than that illustrated in FIG. 8 to produce a useful working action. For example, the fluid could be used for direct application against a movable member other than a valve spool. As illustrated in FIG. 16, the fluid is shown as working directly against a piston 50 which is carried on a rod 51. The piston 50 is illustrated as being slidably mounted in a bore 52 of an apparatus 11a which is to be controlled by the valve 10.

As shown in FIG. 8, the valve element operating means 19 is adapted to be moved from its normal position shown in FIG. 8 by a rotary actuator means generally indicated by the numeral 53, to a position whereby the valve seal 34 closes the outlet orifice 33. As shown in FIG. 8, the rotary actuator means 53 comprises a circular body member or pivot shaft 54 which is rotatably mounted in a bore 55 in the valve body 12 at a position adjacent the valve chamber 13. The bore 55 communicates with the valve chamber 13 to permit the rotary actuator means 53 to engage the valve element operating means 19 for moving the same, as described hereinafter. As shown in FIG. 14, the rotary actuator body 54 has a portion removed along the lines 56 and 57 to provide a finger or projection 58 that is adapted to engage the shoulder 25 in the external annular recess 24 (FIG. 8) on the valve element operating means plunger 20.

As shown in FIG. 4, the rotary actuator body 54 includes the integral, upwardly extended shaft 59 which extends upwardly into bore 60 in the bearing member 61 which is seated in the outer end of the bore 55. The rotary actuator means 53 is rotatable in the bore 55 and the bearing member 61, but it is held against longitudinal movement by the bearing member 61, the thrust bearing 62 and the releasable snap ring member 63. The inner end of bore 60 is conically shaped and the outer end of the bearing member 62 is conically shaped with a different angle to form a substantially point contact or minimum bearing area contact therebetween. The body or rotary pivot member 54 is provided with an O-ring means 64 which is mounted on the body shaft 59 and positioned between the shoulder 65 of the rotary actuator body 54 and the spacer washer 66.

As shown in FIG. 4, the rotary actuator means 53 is provided with a lever or bell-crank operator 67 which has one end located in a slot 68 formed on the body shaft 59 (FIGS. 11 and 12) and held in radial position by a tongue 69 engaging recess 70 formed in the bottom of slot 68 in rotary actuator body shaft 59. The bell-crank operator 67 is held firmly between the slot shoulders 71 on the actuator body shaft 59 and the thrust bearing 62 and it extends outwardly through a clearance slot 72 (FIG. 4) formed in bearing member 61 and outwardly further through a clearance slot 73 in bore 55 into leaf spring chamber 74 in the valve body 12.

As shown in FIG. 2, a leaf spring 75 is mounted in the leaf spring chamber 74 in the valve body 12, and it has one end thereof in seating engagement against the bell-crank operator 67 at the point 76. The other end of the leaf spring 75 is seated in the seat 77 which is formed on an abutment member 78 that is threadably mounted in the hole 79 in the valve body 12. Abutment member 78 is designed to be preset internally with no external adjustment means provided.

As shown in FIGS. 2 and 15, the leaf spring 75 is engaged at a central point thereon by the solenoid plunger 80 of an electrical solenoid generally indicated by the numeral 81. The electrical solenoid 81 may be of any suitable, conventional type. As shown in FIG. 15, the outer end of the solenoid plunger 80 is provided with a slot 82 on the lower side thereof in which is received the leaf spring 75. The solenoid 81 is seated in a suitable solenoid chamber 83 formed in the valve body 12. As shown in FIG. 1, the one side of the valve body 12 is adapted to be enclosed by a suitable cover 84, which is secured in place by any suitable means, as by the screw 85. The numeral 86 in FIG. 2 indicates a manual operator for solenoid plunger 80.

In operation, the rotary actuator means 53 and the valve element operating means 19 are in the positions shown in FIG. 8 at the start of a pilot control operation, or other function, by the illustrative valve of the present invention. When the solenoid 81 is energized, the plunger 80 is pulled inwardly so as to move the leaf spring 75 to the broken line position 87, (FIG. 2) whereby the bell-crank operator 67 is moved clockwise, and in turn the valve element operator means 19 is moved downwardly against the action of the spring 26 as viewed in FIG. 8, to close the outlet orifice 33 and open the inlet orifice 14. The fluid under pressure then enters through the inlet orifice 14 and passes through the valve chamber 13 and the passageway 42 into the chamber 39. The fluid under pressure then exerts a force on the diaphragm 43 which transmits the force to the fluid pressure operated head 47 which in turn moves the valve spool 48. When the source of fluid under pressure is disconnected from the inlet passageways 15, 16 and 17 and the solenoid 81 remains energized, the freely movable valve seal 18 will be moved to the inlet orifice 14 by fluid under pressure trapped in the valve chamber 13, so that the seal 18 will seat against the inlet orifice 14 and retain the fluid under pressure in the valve chamber 13 and effect a holding operation. When the solenoid 81 is de-energized, the spring 26 returns the valve element operating means 19 to the position shown in FIG. 8 and the outlet orifice 33 is opened to permit the chamber 39 and the fluid passageways 41 and 42 and the valve chamber 13 to be exhausted to the atmosphere.

It will be seen that the leaf spring 75 functions as a toggle joint means. When the solenoid 81 pulls the leaf spring 75 to the broken line position 87, the solenoid 81 is sealed magnetically, with only the force of the leaf spring to be overcome. There is no opposing force created by the valve itself which would function to unseat the solenoid 81. There is no resulting action of the spring 26, or air pressure created within the valve, which would cause any adverse back pressure or force on the solenoid 81. It will also be seen that the threadably mounted abutment 78 permits the leaf spring 75 to be adjusted to any desired operative position and that the adjustable exhaust stem member 29 can be positioned to conform to any resultant movement initiated by the solenoid 81. The bellcrank operator 67 functions with the leaf spring 75 to provide a mechanical advantage which reduces the force of operation necessary to operate the valve. Accordingly, it will be seen that the solenoid 81 can be a small solenoid since it does not have to overcome any large back pressure or force created by the valve structure.

What is claimed is:

1. A three-way double poppet valve comprising:
   (a) a valve body;
   (b) a valve chamber in said valve body;
   (c) an inlet orifice formed in said valve body and communicating with said valve chamber and a source of fluid under pressure for admitting fluid under pressure into said valve chamber;
   (d) fluid passage means communicating with said valve chamber for receiving fluid under pressure from said valve chamber and conveying it into operative engagement with a movable, fluid pressure operated member of an apparatus operated by the valve;
   (e) an outlet orifice for exhausting fluid under pressure to the exterior of the valve from said valve chamber and fluid passage means;
   (f) a first valve element freely movable in said valve chamber for movement between a closed position over said inlet orifice to block flow of fluid therethrough and an open position to allow flow of fluid into the valve chamber;
   (g) a valve element operating means movably mounted in said valve chamber;
   (h) a second valve element movable between a closed position over said outlet orifice to block flow of fluid therethrough and an open position to exhaust fluid from said valve chamber and passage means;
   (i) means normally biasing said valve element operating means in one direction to a first position to engage said first valve element and move it to its closed position over said inlet orifice, and to move said second valve element to its open position; and,
   (j) means engaging said valve element operating means and operative for moving the valve element operating means, against the action of said biasing means, in another direction to a second position, to allow said first valve element to be moved by fluid under pressure to its open position and to move said second valve element into its closed position, whereby, when the source of fluid under pressure is disconnected from said inlet orifice, the fluid under pressure in said valve chamber will move the freely movable first valve element to its closed position to hold the fluid under pressure in the valve chamber and fluid passage means until said last mentioned means is inoperative and allows the valve element operating means to be biased by said biasing means to its normal first position.

2. A three-way double poppet valve as defined in claim 1, wherein:
   (a) said first and second valve elements comprise poppet type valve seals.

3. A three-way double poppet valve as defined in claim 1, wherein:
   (a) said valve includes an adjustable member mounted in said valve chamber, and said outlet orifice is formed in said adjustable member, whereby the position of the outlet orifice may be adjusted relative to said second valve element to vary the opening between the outlet orifice and the second valve element when the second valve element is in its open position.

4. A three-way double poppet valve as defined in claim 1, wherein:
   (a) said means for normally biasing said valve element operating means to a first position comprises a spring means.

5. A three-way double poppet valve as defined in claim 1, wherein:
   (a) said valve chamber comprises an elongated cylindrical recess formed in said valve body with a closed inner end and an open outer end, and said inlet orifice is disposed at said closed inner end;
   (b) the open outer end of said cylindrical recess is enclosed by a threaded member which may be adjusted inwardly and outwardly in the recess and in which is formed said outlet orifice;
   (c) said valve element operating means is movably mounted in said cylindrical recess between said inlet orifice and said outlet orifice;
   (d) said first valve element is freely movable in said cylindrical recess between said inlet orifice and said valve element operating means; and,
   (e) said means for normally biasing said valve element operating means to a first position comprises a spring means.

6. A three-way double poppet valve as defined in claim 5, wherein:
   (a) said valve element operating means comprises a plunger having a valve element engagement portion on one end directed toward said inlet orifice and engageable with said first valve element to move it to its closed position;
   (b) said plunger is provided with a pocket on its other end in which is received a portion of the adjustable member carrying said outlet orifice; and,
   (c) said spring means comprises a coil spring having one end mounted in the pocket in said plunger and the other end extended outwardly of said plunger into seating engagement against said adjustable member.

7. A three-way double poppet valve as defined in claim 6, wherein said valve element engagement portion includes:
   (a) a pocket having a raised cylindrical central portion that seats on the central portion of the first valve element when the valve element operating means moves the first valve element to its closed position.

8. A three-way double poppet valve as defined in claim 1, including:
   (a) a diaphragm mounted between said fluid passage means and said movable, fluid pressure operated member of said apparatus operated by the valve for transmitting the operating pressure of the fluid in the fluid passage means to said fluid pressure operated member.

9. A three-way double poppet valve as defined in claim 1, wherein:
   (a) said means engaging said valve element operating means for moving it against the action of said biasing means comprises an electrical solenoid operated means.

10. A three-way double poppet valve as defined in claim 1, wherein said means engaging said valve element operating means and operative for moving the valve element operating means against the action of said biasing means comprises:
    (a) a rotary actuator member rotatably mounted in said valve body and provided with means for engaging said valve element operating means for moving the valve element operating means from its first position to said second position; and,
    (b) means for rotating said rotary actuator member from an inoperative position to an operative position to move said valve element operating means to said second position.

11. A three-way double poppet valve as defined in claim 10, wherein:
    (a) said means on said rotary actuator member comprises a radially outward extended projection that extends into said valve chamber and engages said valve element operating means.

12. A three-way double poppet valve as defined in claim 10, wherein said means for rotating said actuator member from said inoperative position to said operative position includes:
(a) an electrical solenoid operated means; and,
(b) means interconnecting said solenoid means and said rotary actuator member for rotating the actuator member, when the solenoid is energized, from said inoperative position to said operative position.

13. A three-way double poppet valve as defined in claim 12, wherein:
(a) said means interconnecting said solenoid means and said rotary actuator member includes a spring means.

14. A three-way double poppet valve as defined in claim 12, wherein:
(a) said means interconnecting said solenoid means and said rotary actuator member comprises a toggle joint means.

15. A three-way double poppet valve as defined in claim 10, wherein said means for rotating said rotary actuator member from said inoperative position to said operative position includes:
(a) a crank arm conneced to said rotary actuator member;
(b) an electrical solenoid means having a plunger which is moved in one direction from its inoperative position when the solenoid means is energized; and,
(c) spring means interconnecting said crank arm and said solenoid plunger, whereby when the solenoid means is energized the plunger is moved in said one direction and exerts a force on said spring means which transmits the force to said crank arm to rotate the crank arm and the rotary actuator member from said inoperative position to said operative position.

16. A three-way double poppet valve as defined in claim 15, wherein:
(a) said spring means comprises a leaf spring having one end engaged with said crank arm and the other end disposed against an abutment means in said valve body; and,
(b) the solenoid plunger is connected to the leaf spring at an intermediate point thereon, whereby when the solenoid means is energized the solenoid plunger is moved from its inoperative position and the leaf spring is flexed from a bowed position to a straight position, and when the solenoid means is de-energized the leaf spring springs back to said bowed position and returns the solenoid plunger to its inoperative position.

17. A three-way double poppet valve as defined in claim 16, wherein:
(a) said leaf spring abutment means comprises an adjustable screw for adjusting the initial bowed position of said leaf spring to control the length of stroke of the solenoid plunger and the rotation of crank arm.

18. A three-way double poppet valve as defined in claim 15, wherein:
(a) said rotary actuator member is rotatably mounted in a bore in the valve body and is provided with a shaft on one end having a longitudinally disposed slot with a recess formed in the bottom wall of the slot between two shoulders formed by said bottom wall;
(b) said last mentioned slot is open at the upper end of the rotary actuator member shaft;
(c) said crank arm has one end thereof seated partially in said slot and resting on said shoulders, and said one end of the crank arm is provided with a tongue that extends into said last named recess; and,
(d) said crank arm one end is retained in said slot by a bearing means which engages said crank arm one end.

19. A three-way double poppet valve as defined in claim 18, wherein said bearing means comprises:
(a) a first bearing member disposed in the outer end of the rotary actuator member bore in the valve body and releasably retained against outward movement;
(b) said first bearing member being provided with an axial, inwardly extended bore on the inner end thereof which has a conically shaped inner end wall;
(c) a second bearing member in said last named bore in a position between said crank arm one end and said first bearing member; and,
(d) said second bearing member having one end thereof abutting said crank arm one end, and the other end thereof being provided with a conically shaped end that is seated against the conically shaped inner end wall of said last named bore.

20. A three-way, double poppet valve comprising:
(a) a valve body having a valve chamber connected to a fluid passageway means;
(b) said valve chamber being provided with a pressurized fluid inlet orifice and an outlet orifice for exhausting the valve chamber;
(c) a pair of opposed poppet valve elements which are alternately movable to open and closed positions over said orifices;
(d) a valve element operating means for moving said poppet valve elements to said open and closed positions;
(e) biasing means normally biasing said valve element operating means in one direction;
(f) a rotary actuator for moving the valve element operating means in another direction;
(g) an electrical solenoid having an operating plunger; and,
(h) a toggle joint means interconnecting said rotatary actuator and the solenoid plunger, whereby when the solenoid is energized the plunger will operate the toggle joint means which will rotate the rotary actuator to move the valve operating means in said another direction and when the solenoid is de-energized the toggle joint means will move the solenoid plunger to its de-energized position.

21. A three-way, double poppet valve as defined in claim 20, wherein:
(a) said toggle joint means comprises a spring means.

22. A three-way, double poppet valve as defined in claim 20, wherein:
(a) said rotary actuator is provided with a crank arm;
(b) said toggle joint means includes a leaf spring having one end engaged with said crank arm and the other end engaged with an adjustable abutment means for adjusting the leaf spring to an initial bowed position; and,
(c) said solenoid plunger is connected to the leaf spring at an intermediate point thereon, whereby when the solenoid is energized the plunger will pull the leaf spring to a straightened position so that the spring will pivot the crank arm to rotate the rotary actuator member, and when the solenoid is de-energized the leaf spring will return to the initial bowed position and move the solenoid plunger to its de-energized position.

References Cited

UNITED STATES PATENTS

| | | | |
|---|---|---|---|
| 925,673 | 6/1909 | Zook | 251—138 |
| 2,585,711 | 2/1952 | Whitney et al. | 251—138 |
| 3,015,339 | 1/1962 | Savage | 137—596.17 XR |
| 3,313,317 | 4/1967 | Mosier | 251—138 XR |
| 3,002,498 | 10/1961 | Quayle | 137—596.17 XR |

HENRY T. KLINKSIEK, Primary Examiner

U.S. Cl. X.R.

251—138